US007016263B2

(12) United States Patent
Gueissaz et al.

(10) Patent No.: US 7,016,263 B2
(45) Date of Patent: Mar. 21, 2006

(54) DEVICE FOR DATA INPUT INTO A PORTABLE OBJECT

(75) Inventors: François Gueissaz, Wavre (CH); Dominique Piguet, Lausanne (CH)

(73) Assignee: Asulab S.A., Marin (CH)

( * ) Notice: Subject to any disclaimer, the term of this patent is extended or adjusted under 35 U.S.C. 154(b) by 390 days.

(21) Appl. No.: 10/333,820

(22) PCT Filed: Jul. 10, 2001

(86) PCT No.: PCT/EP01/07906

§ 371 (c)(1),
(2), (4) Date: Jan. 27, 2003

(87) PCT Pub. No.: WO02/10865

PCT Pub. Date: Feb. 7, 2002

(65) Prior Publication Data

US 2005/0249046 A1 Nov. 10, 2005

(30) Foreign Application Priority Data

Jul. 27, 2000 (EP) .................................. 00202670

(51) Int. Cl.
*G04B 47/00* (2006.01)
*G04B 19/30* (2006.01)
*G04B 37/00* (2006.01)
*G09G 9/08* (2006.01)
*G01H 1/66* (2006.01)

(52) U.S. Cl. .......................... 368/10; 368/69; 368/291; 368/309; 335/153; 338/32 H; 345/156; 345/161

(58) Field of Classification Search .................. 368/10, 368/69, 281, 291–292, 309, 319–321; 338/32 R, 338/32 H, 32 S; 345/156, 157, 160, 161
See application file for complete search history.

(56) References Cited

U.S. PATENT DOCUMENTS

| | | | | |
|---|---|---|---|---|
| 3,921,108 | A * | 11/1975 | O'Connor | 335/153 |
| 4,041,427 | A * | 8/1977 | Chusha | 335/205 |
| 4,366,463 | A * | 12/1982 | Barker | 338/69 |
| 5,168,221 | A | 12/1992 | Houston | |
| 5,504,502 | A * | 4/1996 | Arita et al. | 345/160 |
| 5,508,719 | A | 4/1996 | Gervais | |
| 5,714,980 | A * | 2/1998 | Niino | 345/160 |
| 6,094,190 | A | 7/2000 | Kodim | |
| 6,670,946 | B1 * | 12/2003 | Endo et al. | 345/160 |

FOREIGN PATENT DOCUMENTS

WO WO 98 54624 A1 12/1998

* cited by examiner

*Primary Examiner*—Vit W. Miska
(74) *Attorney, Agent, or Firm*—Sughrue Mion, PLLC

(57) ABSTRACT

The invention concerns a device for data entry into a portable object, in particular a watch, with display screen comprising a control button (1) consisting of an elastic mass (2) wherein is housed a permanent magnet (3) and a positioning analogue magnetic sensor (4) with Hall effect for example, arranged inside the object opposite to and spaced apart from said control button (1), said sensor being adapted to measure the movements of the magnet (3) in at least one direction for data entry. The control button (1) is arranged in a blind housing (7) of a non-magnetic wall (5) of the object structure, to be mechanically uncoupled from the sensor, said wall not in contact with said sensor acting as sealing protection for the sensor.

16 Claims, 3 Drawing Sheets

DEVICE FOR DATA INPUT INTO A PORTABLE OBJECT

Figure 1:
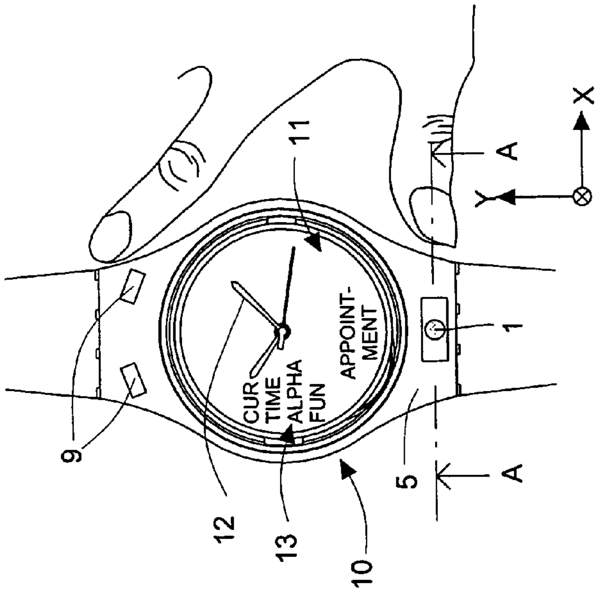

The invention concerns a device for data entry into a portable object, in particular a watch, said device including a control button, wherein a permanent magnet is housed, and a magnetic sensor arranged inside the object, said sensor being able to provide electric signals representing movements of the magnet in at least one direction for data entry.

Data to be entered in said object concern both time-setting commands in the case of an analogue or digital watch in which the movements of the magnet are measured by the analogue magnetic sensor to provide analogue electric signals representing, for example, the desired time-setting speed, and the read command, or the entry of messages or calculations, or game commands or programming for several functions.

In the fields of several daily activities, the use of small size portable objects, provided with electronic modules for executing many functions, is widespread. Control members or buttons for entering data or reading information are arranged on the case or the structure of the object so that the functions of the object can be used. These objects are for example portable phones, electronic address books, calculators or mainly wristwatches which are commonly used with data entry devices of various kinds.

By way of illustration of a keying member for data entry into a portable object, one can cite U.S. Pat. No. 5,841,849, which describes a personal telecommunication device. The member takes the form of a rotary ball mounted in a complementary shaped housing in the telephone case. The rotations of the ball are detected to move a cursor on one of two screens into a function selection position. As soon as the cursor is positioned, the ball can be pressed to validate the selection. Given that there is mechanical contact between the ball and parts of the housing, which transmit the electric signals to processing means, wear is inevitable. Furthermore, this arrangement of the ball in its housing does not guarantee sealed protection of the electrical elements co-operating with said ball.

In the case of a wristwatch, keying members, such as levers, have already been proposed for carrying out commands in at least two directions for an electronic game integrated in the watch. One can cite in particular U.S. Pat. No. 4,395,134, which describes such a wristwatch with a digital display. This wristwatch includes a data entry device with a control lever used mainly as a joystick.

After removing the joystick from a storage housing in the wristband, its end is removably fixed inside an elastic mass or matrix whose lower edges are held on one surface of a support in order to create a cavity between the support and a lower wall of the elastic mass. A metallic piece is fixed to said lower wall in order to form a metallic bridge, i.e. a short-circuit between metal pads arranged on an integrated circuit to detect movements in two directions (X, Y) when the lever is activated.

The data entered by this type of lever is achieved by short-circuiting metal paths, i.e. in an on-off manner, which means that a distinct analogue type measurement cannot be made as a function of the movements of said lever in one or the other of two directions, as would be the case with a Hall effect sensor which measures the movements of a permanent magnet. Furthermore, the metal pads are not kept sealed from the external environment.

Data entry devices, which combine magnetic Hall-effect sensors and magnets, have been disclosed, in particular in the computer field, for applications other than horological applications. Japanese Patent document No 8-152961 A describes an example of such a data entry device using a computer keyboard control button. A single magnet is housed inside the button in two parts, which fit together. The lower part of the button includes a cavity, set on a complementary shaped structure, which carries an analogue magnetic Hall-effect sensor for measuring the movements of the magnet in two directions (X, Y). A second magnet is disposed under the sensor structure to ensure better detection of magnetic field variations on the sensor measurement pads.

However, no precautions are taken to isolate the Hall-effect sensor in a sealed manner from an environment that is not protected against elements such as water or aggressive chemical products, because said button is used only in the field of computers, which are usually placed in places free of such noxious elements. Furthermore, the lower part of the button is in direct mechanical contact with the structure carrying the sensor, which can induce wear.

Another example of a similar embodiment of a control button for data entry can also be cited with reference to U.S. Pat. No. 5,714,980. The assembly forming the control button, includes several magnets arranged on one face of a control button disk facing an equivalent number of measurement pads of an analogue magnetic Hall-effect sensor arranged on the bottom of a casing for measuring the movements of the magnets in two directions (X, Y). Elastic elements link the button disk to the upper part of the casing to keep the button in a centred idle position.

As previously described, no precautions have been taken to protect the magnetic sensors from the influence of the environment, given that the button is used in the computer field, protected from aggressive external conditions.

Japanese Patent document No. 10-20999 A shows a way of using detection in both directions to define orientation of the control button. The control button includes Hall-effect sensor elements on a support and a magnet opposite and spaced apart from the elements. The magnet is inserted in a spring, which leans against a surface of said support without allowing it to protect the sensor elements.

The invention concerns a data entry device using the combination of a magnet and a magnetic sensor, for example a Hall-effect sensor, for detecting the movements of said magnet to overcome the drawbacks of the aforecited prior art devices.

This object, in addition to others, is achieved by the device for data entry into a portable object, in particular in a watch, characterised in that the analogue control button comprises an elastic mass housing the permanent magnet, and in that the control button is arranged on an external non-magnetic wall of the object so as to be mechanically uncoupled from the analogue magnetic sensor, which is placed facing the control button and on the other side of the wall, said wall being used as a sealing protection for the sensor and for electronic means housed inside the object to manage electric signals of the device.

One advantage of the device for data entry into a portable object consists of the combination of a permanent magnet and a magnetic sensor, for example a Hall-effect sensor, separated by a wall keeping the sealing of the portable object, without any intrusion, through said wall, by noxious elements from the environment in which the object is placed. Modification of the orientation of the magnetic field, by moving the button that includes the magnet, can easily be detected by said sensor through the non-magnetic wall of the object.

Another advantage of the device consists of the use of a monolithic magnetic sensor, for example a Hall-effect sensor, placed opposite and spaced apart from the permanent magnet, which is entirely enclosed inside an elastic mass or matrix. The sensor can be without any contact or in contact with the non-magnetic wall. The sensor is fixed to a printed circuit board that also receives the electronic units or means for processing electric signals provided by the sensor. Since measurement of the movements of the control button are made by a magnetic field passing through the non-magnetic wall, the printed circuit board carrying the sensor does not need to be in direct contact with the wall that carries the control button.

Another advantage of the device consists in providing a housing on the non-magnetic wall, which can be a metallic wall, in order to be able to house the elastic mass enclosing the permanent magnet so as to facilitate the mounting of said control button when the object is manufactured. This housing is also used to provide better lateral holding of the control button, which can be moved in particular in two directions.

Of course, if the housing that is, for example of complementary shape to the mass, is not made on said wall, a mark has to be provided on the wall so that said mass can be fixed precisely without any difficulty, or a tool for mounting the button has to be used during manufacture of the object, taking into account the location of the sensor inside the object in order to place it precisely on the external wall.

With the arrangement of the control button and the magnetic sensor, one can envisage measuring movements along one, two or three axes as a function of desired requirements for the manufacture of the portable object. However, measurement with a single sensor in two directions is preferable in order to be able to move a cursor on a display screen with the same control button or to go from one function table to another function table.

Figure 2A:
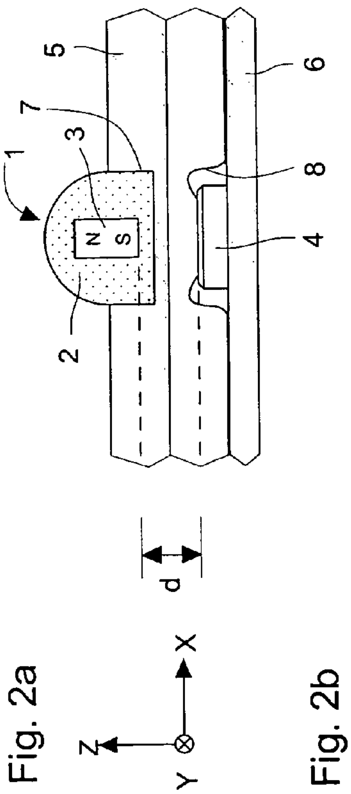
Figure 2B:
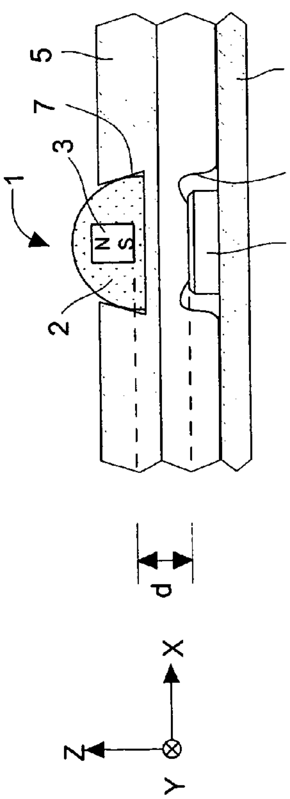
Figure 3:
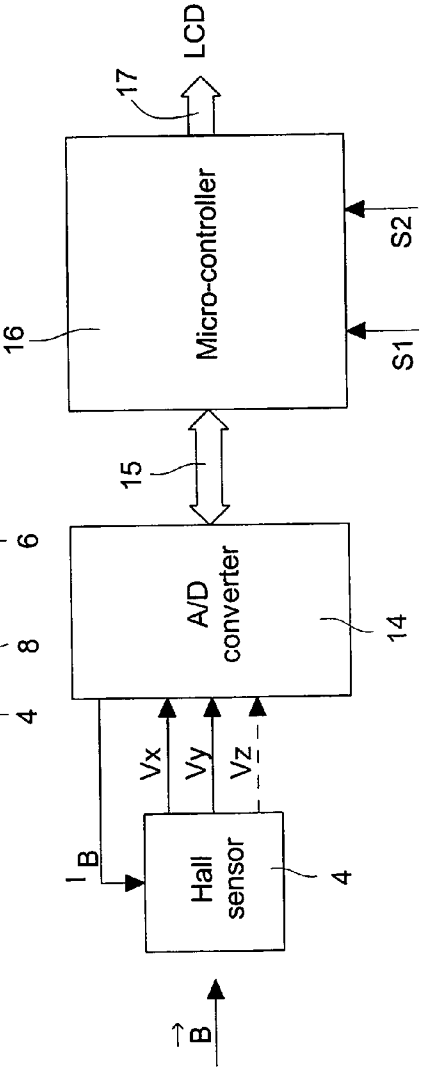
Figure 4:
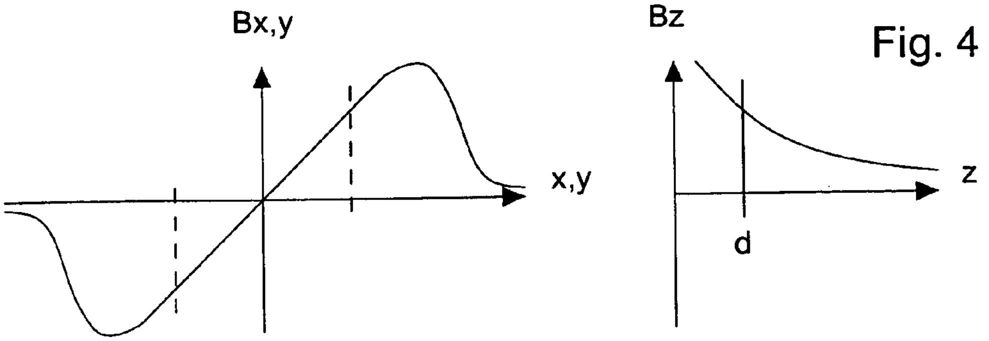
Figure 6:
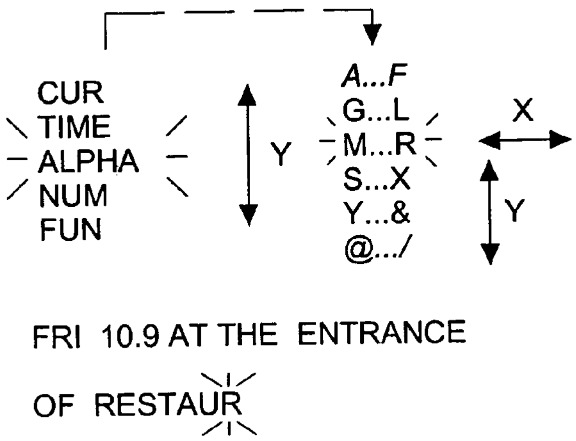
Figure 7:
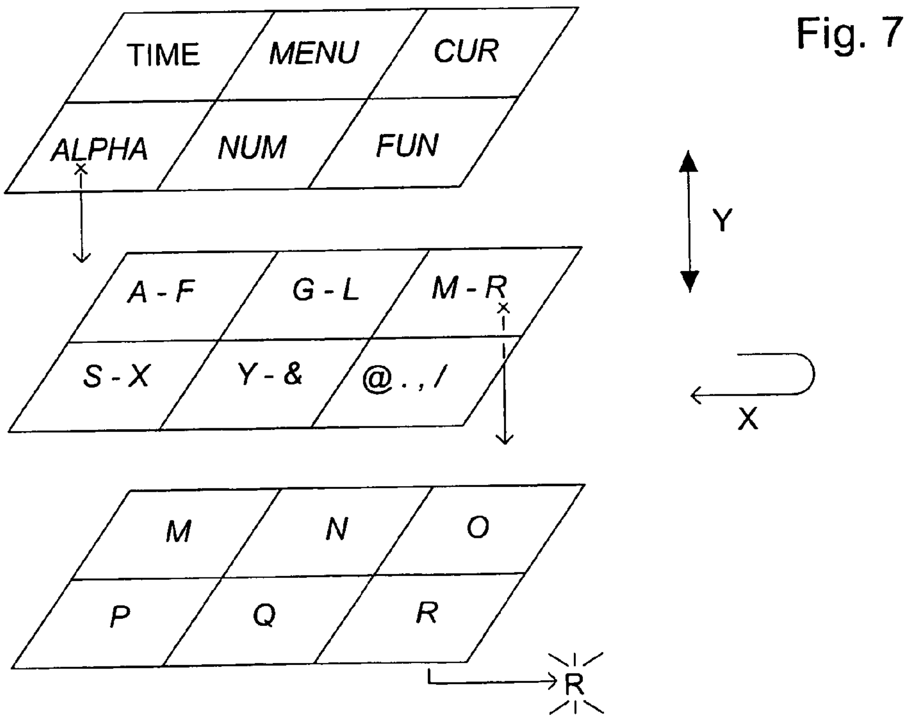
Figure 5:
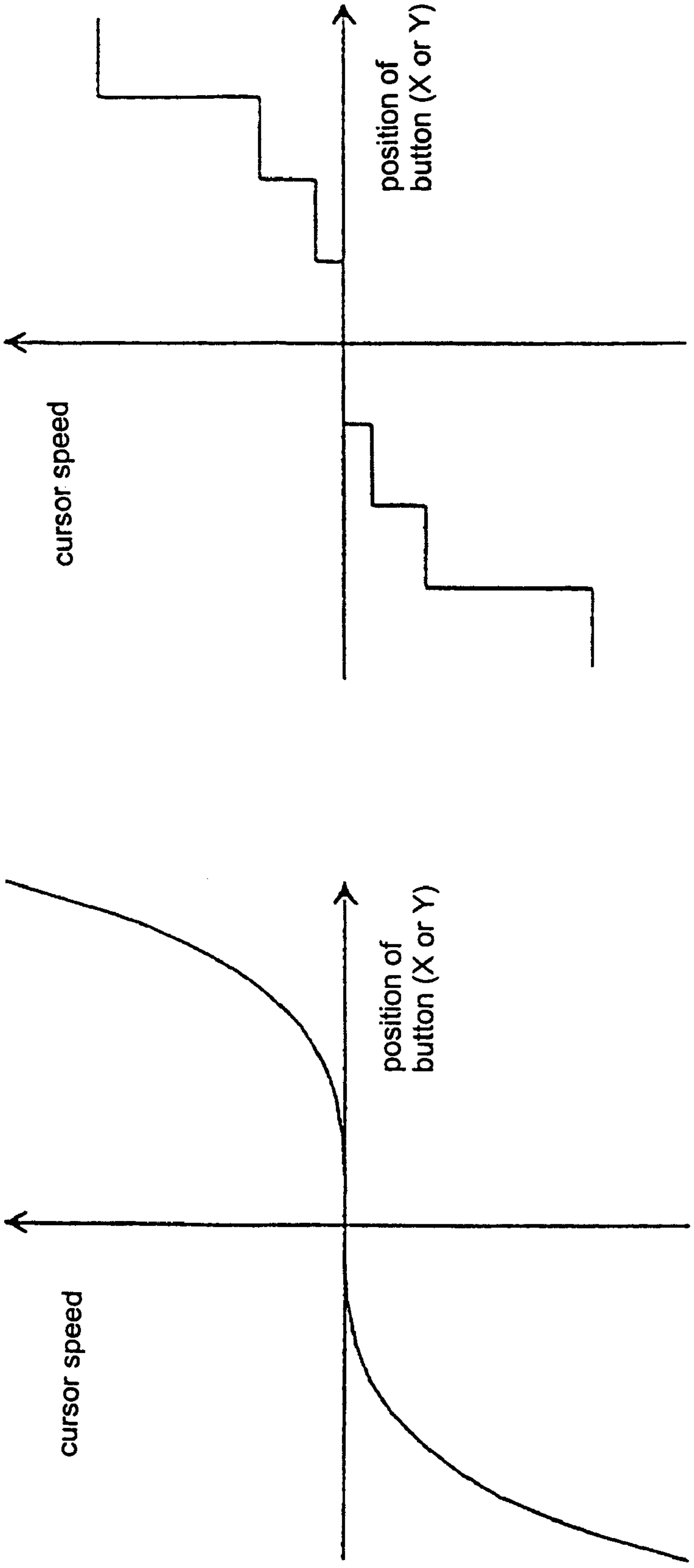

The objects, advantages and features of the device of the invention will appear more clearly in the following description of embodiments given solely by way of example and illustrated by the drawings, in which:

FIG. 1 shows a top view of the object in the form of a wristwatch with a control button and two validation buttons of the data entry device according to the invention, FIGS. 2*a* and 2*b* show a partial vertical cross-section along the line A—A of FIG. 1 of two embodiments of the control button and the magnetic sensor of the data entry device, FIG. 3 shows a synoptic diagram of electronic units for processing signals provided by the sensor of the device according to the invention, FIG. 4 shows two graphs of the magnetic field generated by the magnet and measured by the sensor along the X, Y and Z directions of the magnet movement, FIG. 5 shows two graphs of the cursor speed on the display screen as a function of the location of the control button along the X and Y directions, FIG. 6 shows the way to select the menus or elements of each menu that appear on the display screen of the object taking into account the movements along the X and Y axes of the control button, and FIG. 7 shows a selection variant of FIG. 5 wherein menu tables are chosen taking into account the movements along the X and Y axes of the control button.

In the following description, the embodiments of the data entry device are preferably explained only with reference to the embodiment of a wristwatch of analogue or digital type, but it is clear that the device according to the invention can be mounted on other portable objects having electronic modules, such as for example a telephone, a calculator or an electronic address book. Furthermore, all those elements known to those skilled in the art, which form the various parts of the watch will not be described in detail. Reference will be made only to the elements necessary to make preferred embodiments of said watch.

In FIG. 1, a part of an analogue type wristwatch 10 is shown. This watch includes a dial or display screen 11 formed of a liquid crystal display device so as to be able to display in particular data or various menus 13 to be selected, hands 12 for indicating the time, electronic units housed inside the case, in particular for managing electric signals originating from the data entry device, a control button 1 with a permanent magnet arranged on a non-magnetic wall of case 5 for transmitting a magnetic field to a magnetic sensor 4, for example a Hall-effect sensor, housed within the case, and selection buttons 9 or entered data validation buttons.

Watchcase 5 encloses all the electronic units or means in a sealed manner, including the magnetic sensor, for example a Hall-effect sensor, in order also to provide time functions, and the various menus or messages to be displayed on display screen 11. The whole case, or at least a wall in proximity to control button 1 has to be made of a non-magnetic material so as to allow the magnetic field generated by the permanent magnet of the control button to pass undisturbed through wall 5 so that the sensor detects the movements of the magnet.

Said control button 1 with the permanent magnet, which constitutes the main element of the data entry device, can be manipulated by a user's finger preferably in two directions X and Y so that the magnetic sensor, for example a Hall-effect sensor not shown in FIG. 1, hermetically housed within the watchcase measures magnetic field variations due to the movements imposed on the magnet. The analogue information relating to the magnetic field values along the X and Y directions detected by the sensor is transmitted via an analogue/digital converter to a micro-controller, which manages the received signals and transmits the data to be displayed on the display screen 11.

The data entry device of the invention further includes the sensor, the converter and the micro-controller, but FIG. 1 shows only control button 1 placed on a non-magnetic wall 5 of the case and selection buttons 9.

Buttons 9 can be used for validating selected data with control button 1, for deleting validated data or for move backwards in a selection menu. Of course, selection buttons 9 can be used to execute other operations known to those skilled in the art for making a multifunctional watch.

Given that the selection buttons are used for providing, for example, a validation, return or erase command, they can be made simply in the form of pressure switches using a stem with a sealed passage commonly used in watch-making. However an embodiment in the form of a control button combined with another magnetic sensor spaced apart from and opposite the button magnet can be envisaged.

As can be noted for example in FIG. 1, when the watch is worn on the wrist, selection buttons 9 are positioned on the case of the side of the 12 o'clock indication in order to be able to be pressed for example by the user's index finger, whereas control button 1 is positioned on the case of the opposite side of the dial in order to be able to be easily manipulated by the user's thumb. Any other position of the buttons on the case can also be envisaged with regard to other ergonomic criteria.

In another embodiment of the data entry device not shown in the Figures, the selection buttons can be omitted. In this case, the magnetic sensor must be able to measure magnetic field variations of the control button magnet along the three X, Y and Z axes. The magnetic field values along the X and Y axes allow the data to be entered to be selected by passing from one displayed menu or function table to another, whereas the magnetic field along the Z axis allows the chosen data to be validated and/or stored. However, as will be explained in more detail hereinafter with reference to FIGS. 2 to 7, since positioning at the data to be entered and storage of such data is carried out with the same control button and the magnetic sensor measures along three axes, this causes certain problems, in particular at the moment that the control button is pressed along the Z axis to validate the chosen data. This is why it may be preferable, depending upon the moving mode of the cursor, to use the magnetic sensor for measuring either in two directions X and Y, or in a single direction Z when one wishes to measure the pressure or force applied to said button to provide magnetic field values depending on said force.

The possibility of using the magnetic sensor for measuring the force applied to said button along the axis Z for example allows one to vary the speed at which the hand moves or the numbers scroll down, when the time of a wristwatch is set by varying the pressure on said button.

However, problems of positioning on three axes can be resolved by allocating a non-linear kinetic function to axes X and Y. FIG. 5 shows two graphs of the cursor speed on the display screen as a function of movement along the X or Y direction. This type of function, shown in FIG. 5, allows precise control of the cursor movement speed and has the great advantage of permanently maintaining the selected location simply by releasing the button which returns to its rest position, corresponding to zero cursor speed. Once the desired position is reached, it is possible to apply a short vertical pressure along the Z axis in order to validate the selected position. The non-linearity of the speed control allows, on the one hand, precise positioning of the cursor in X and Y and on the other hand, prevents any unintentional movement of the cursor during validation by pressure in Z.

FIG. 2*a* shows schematically a cross-section along line A—A of FIG. 1 of control button 1 and the magnetic sensor 4 which is advantageously made of a semiconductor material (for example a Hall effect sensor). Said control button 1 is formed of an elastic mass 2, for example made of a rubber material, completely covering a permanent magnet 3, which can be made of samarium cobalt (Sm—Co) or iron-neodyme-boron (Fe—Nd—Bo). The lower part of this button 1 has a cylindrical shape and is preferably arranged in a blind housing or recess 7 of complementary shape made in a non-magnetic wall 5 of the watchcase, on the external side. The upper part of the button has a dome shape and protrudes from the housing so as to be easily manipulated by a user's finger.

One can envisage fixing the bottom face and possibly the lateral surface of the lower part of the elastic mass 2 of button 1 in housing 7 by any means known by those skilled in the art, in particular by bonding. The housing allows the control button to be better held when it is manipulated in the X and Y directions, and possibly allows the movements of the magnet to be limited in one or the other of these directions.

In an alternative embodiment shown in FIG. 2*b*, the elastic mass 2 of control button 1 has the shape of a half sphere or spherical dome, the lower part of which is driven into a housing having a truncated shape and an opening whose diameter is smaller than the base of the lower part of the mass or of a complementary shape to said lower part of the mass, not shown in FIG. 2*b*. In this case, it is no longer necessary to bond the bottom surface of button 1 to the bottom of housing in order to hold it, however making such a housing can cause certain difficulties during machining.

It is obvious that other shapes can be envisaged for the elastic mass and housing to fulfil the same functions, for example the control button could have a pyramidal or truncated shape arranged in a housing of complementary shape. The upper part of said button can also be arranged on the exterior surface of the wall while leaving the possibility of being easily manipulated by a user's finger.

One could also envisage fixing the control button to the non-magnetic wall without inserting it in a housing. In order to do this, either a positioning index on said wall should be provided when the button is mounted for it to be precisely positioned opposite and at a distance from the sensor, or a positioning tool able to take account of the position of the sensor should be used for positioning the button on the wall during mounting.

The permanent magnet has a magnetisation axis perpendicular to the non-magnetic wall and to the magnetic sensor. The orientation and magnitude of the magnetic field in the sensor's plane are parallel and approximately linearly proportional to the radial movement of the magnet in a region which depends on the size of the magnet and the distance d separating the magnet from the sensor. However, along the vertical Z axis, the relationship between the magnetic field and the distance separating the sensor from the magnet is not linear around a given starting distance d as can be seen in the graphs of FIG. 4 that show the magnetic field variations along the three X, Y and Z directions.

In both cases, magnetic field variations of the order of 10 mT or more over the useful movement which is of the order of half the thickness of a quasi-cubic samarium cobalt magnet can be obtained. A semiconductor monolithic Hall effect sensor can easily detect these magnetic field variations.

A sensor of this type that measures the magnetic field for example along three directions is described in particular in EP Patent No 0 947 846 and is marketed under the name 3D-H-10 or 3D-H-30 by Sentron in Zug, Switzerland. This sensor is based on the vertical Hall effect for detection in the plane and on the lateral Hall effect for perpendicular detection. It has contact pads for receiving the supply current and contact pads leading the electric voltages dependent on the applied magnetic field to the outside. These voltages allow the magnitudes of $B_x$, $B_y$, and $B_z$ components of the magnetic field along the three measuring axes X, Y, and Z to be extracted.

Of course, other types of magnetic sensors exist capable of being integrated on very small semiconductor surfaces or other appropriated substrates. These sensors can in particular use the magnetoresistive effect (for example of the HCM1052 type by Honeywell) or the fluxgate principle (cf. the thesis of L. Chiési, <<Planar 2D Fluxgate Magnetometer for CMOS Electronic Compass >>, Hartung-Gorre Verlag, ISBN 3-89649-478-3, 1999).

As can be seen in FIGS. 2*a* and 2*b*, magnetic sensor 4 is placed on a printed circuit board 6 carrying metal paths for electrically connecting the various electronic elements of the data entry device, such as the converter and the microcontroller that are not shown in FIGS. 2*a* and 2*b*. Metal wires 8 connect output pads of the sensor to the contact pads of the metallic paths of the printed circuit board if the sensor is not encapsulated in a plastic material. The sensor placed on the printed circuit board is mechanically uncoupled from control button 1.

The use of non-magnetic wall 5 of the case which is preferably not in contact with the sensor, guarantees total protection of the sensor and associated systems against damp or other external elements capable of damaging them. The watch with its protected data entry device can thus be used without any risk in any environment without any particular precaution. One could envisage making for example a diver's watch into which data can be entered using control and selection buttons.

FIG. 3 shows the electronic circuits of the device connected for example to a Hall effect sensor, which process the electric control signals related to data to be entered or read. These circuits form a part of the electronic units of the watch.

Hall sensor 4 receives from analogue/digital converter 14, a current 1B which passes through the resistive zones of the doped semiconductor substrate, as shown for example in EP Patent No. 0 947 846. Voltages $V_X$, $V_Y$ and $V_Z$ representative of the magnetic field along the three axes, are amplified and digitised in unit 14 (monolithic CMOS circuit). In the case of a sensor measuring the components along the X and Y axes, the sensor can only supply voltages $V_X$ and $V_Y$ at its output.

The analogue/digital converter communicates the numerical values to a micro-controller 16 via a data bus 15 so that it can process said values to supply control signals to the liquid crystal display or the motors driving the hands of the watch via a bus 17. The data to be displayed which depend on the received voltage numerical values and which are transmitted by the micro-controller to watch display, are for example selection menus, value tables, alphanumerical characters or calculations. Two signals S1 and S2 from the selection buttons are also supplied to the micro-controller for deleting data or storing or validating entered data.

The micro-controller includes in particular an oscillator circuit which generates for example a frequency of 32 kHz so as to supply clock signals to logic circuit stages, a frequency division chain for time related data to be displayed, memory means distributed in one read only memory with a dedicated processing and data supplying programme and in a random access memory for storing provisional data. These elements of the micro-controller are not described in detail and are not shown in FIG. 3, as they are well known to those skilled in the art in this technical field.

By way of illustration, reference will be made to FIGS. 5 to 7 to show how the data is entered in the watch using the control button and possibly a selection button.

There are two possible modes of movement for the cursor on a display. The first mode consists in converting the deflection (by pressure) of the button into the absolute position of the cursor on the display. It is a kind of movement amplifier. This mode has the advantage of being fast and intuitive but requires the holding of the position during validation which can be problematic. The second mode consists in converting the deflection (by pressure) of the button into a cursor movement speed (FIG. 5), which has the advantage of allowing the cursor to be immobilised in a selected position when the button is no longer actuated and returned to its rest position. One could also imagine using the deflection of the button to control the acceleration of the cursor (useful for scrolling down a large amount of data but not very intuitive), with a speed cancellation function when the button returns to its rest position.

In FIG. 6, various menus extracted from the memory means of the micro-controller are displayed on the display screen. By moving the control button in the Y direction, a menu or function change is carried out, for example making the position of the menu or function to be selected flash or moving a cursor that appears on the display screen from a position indicating "time" to a position indicating "alpha" (alphanumerical).

From this linear menu, after validation, shown by a dotted line in FIG. 6, one enters a mass of characters formed of segments (A . . . F, G . . . L, etc.). These segments are selected by moving the button along the Y axis and moving the button along the X axis scrolls the characters of one segment down. The selected segment can be displayed alone on the display screen or flashing within the complete displayed mass. Finally, the selected character will be displayed, possibly flashing, at the end of a chain of characters already composed. These operations are repeated until the message to be stored is completed.

It is to be noted that validation of the selected letter can be carried out without using a selection button, but in this case, the letter selection is validated by leaving the control button inactivated for a certain period of time after selection of the letter. However, when the message has been composed, it has to be validated and a message storing command entered, in particular via one of the selection buttons. The message is stored in the micro-controller memory means so as to be able to be subsequently read.

One could also envisage transmitting, in a wireless manner, the entered and stored messages to an external apparatus having a transmission and reception device for electric signals of the same type as that of the watch.

If the menu or function selected when the control button is actuated in the Y direction concerns time setting, movement in the X direction can make the watch hands move forwards or backwards at a speed depending on the magnetic field picked up, i.e. the further the control button is moved from its rest position the faster the watch hands will move forwards or backwards. In the case of an entirely digital watch, movement in the X direction will increment or decrement the time indication shown in figures.

In the embodiment shown in FIG. 7 which is a variant of that shown in FIG. 6, one could also envisage passing from one table of functions to another table by moving the button along the Y axis and passing from one function of the same table to another by moving the button along the X axis as can easily be seen in FIG. 6. First of all, moving the control button along the X axis positions a cursor at a selected function or causes the selected function to flash in the first table. Then, moving the control button along the Y axis causes the table to change. Another table of sub-functions appears under each function of an upper table, when the control button is moved along the Y axis.

It is also possible to scroll down the same tables from a linear menu which is selected by validation. This mode allows the X-Y commands from a selected table to be used to move easily within the table to be used.

In FIG. 7, three tables of functions or menus and sub-functions or sub-menus had to be selected in order to enter, for example, a letter shown flashing in said Figure by moving the control button along the X direction. When the message has been composed, the same validation operations indicated with reference to FIG. 6 can be applied.

From the above description, these skilled in the art can envisage multiple variant embodiments of the data entry device without departing from the scope of the invention. For example, instead of having a single control button, one could envisage providing said watch, or any portable object, with two control buttons, each with an associated magnetic sensor, for example a Hall effect sensor, for measuring the magnetic field of the magnet corresponding to the control button that has been manipulated. Of course, as explained hereinbefore, the selection buttons can be designed in the same way as the control button. The magnetic sensor could also be in contact with an internal surface of the non-magnetic wall protecting it or bonded to said internal surface leaving the magnetic sensor at a distance opposite the magnet of the control button.

What is claimed is:

1. A device for data entry into a portable object, in particular into a watch, said device including a control button arranged on an external non-magnetic wall of the object, said button comprising an elastic mass enclosing a permanent magnet, and a magnetic sensor arranged inside the object on the other side of the wall and facing the control button, said sensor being able to provide electric signals representing movements of the magnet to electronic data processing means, wherein a lower surface of the analogue control button, which is mechanically uncoupled from the sensor, is held fixed so that the magnet in the elastic mass can be bent during movements of said control button, and wherein the analogue magnetic sensor is arranged to measure a magnetic field variation caused by the movement of the button in at least one direction component parallel to said wall, said wall acting as sealed protection for the sensor and the electronic means housed within the object for managing the electric signals of the device.

2. The device according to claim 1, wherein the analogue magnetic sensor is arranged to measure also a magnetic field variation caused by the movement of the button in a second direction component perpendicular to said wall.

3. The device according to claim 1, in an object provided with a data display screen, wherein the data processing means are adapted to determine a linear or non linear scrolling down speed of a cursor or functions or menus or tables or characters to be selected on the screen, on the basis of the electric signals of the sensor which depend on the magnetic field variation caused by moving the control button.

4. The device according to claim 1, wherein the lower part of the elastic mass of the control button is fixed in a blind housing of the non-magnetic wall.

5. The device according to claim 4, wherein the lower part of the elastic mass of cylindrical shape is fixed in the complementary shaped housing.

6. The device according to claim 4, wherein the elastic mass has the shape of a half sphere or spherical, truncated or pyramidal dome, and wherein the housing has a complementary shape to the lower part of the mass or a truncated shape, the housing having an opening whose diameter is smaller than the maximum diameter of the lower part of said mass.

7. The device according to claim 1, wherein the axis of magnetisation of the magnet in the control button rest position is arranged perpendicularly to the non-magnetic wall, and wherein the sensor facing the control button is spaced apart from the non-magnetic wall.

8. The device according to claim 1, in an object provided with a data display screen, wherein the electronic means include an analogue/digital converter receiving voltage values from the sensor for each measuring direction of the sensor, and a micro-controller connected to the converter and provided with memory means in which data are pre-recorded in order to be able to be displayed on the screen by acting on the control button.

9. The device according to claim 1, wherein the sensor made in a semiconductor material is arranged to provide electric signals representing the movements of the control button magnet along two horizontal directions.

10. The device according to claim 1, wherein the sensor made in a semiconductor material is arranged to provide electric signals representing the movements of the control button magnet along two horizontal directions and a vertical direction perpendicular to the non-magnetic wall.

11. The device according to claim 1, in an object provided with a data display screen, wherein it includes at least one selection button allowing the selected data appearing on the display screen to be validated or deleted by the control button.

12. The device according to claim 11, wherein the selection button includes another elastic mass enclosing another permanent magnet, said mass being placed on the non-magnetic wall, and wherein another magnetic sensor is placed within the structure of the object opposite the selection button.

13. The device according to claim 8, wherein moving the control button in one direction causes functions or menus or tables to be selected from the storage means to scroll down on the screen, whereas moving the control button in another direction causes sub-functions or sub-menus or characters to be selected to scroll down.

14. The device according to claim 8, wherein moving the control button along two directions allows one to run through a selected function table on the display screen in a linear or mass movement mode.

15. The device according to claim 9, wherein moving the control button along one of the two horizontal directions allows functions or menus or tables to be selected from the memory means to scroll down on the screen, whereas moving the control button in the other horizontal direction allows sub-functions or sub-menus or characters to be selected to scroll down, and wherein moving the button in the vertical direction allows selection of a function or a menu or characters to be validated.

16. The device according to claim 1, wherein the sensor is a magnetic Hall effect sensor or a magneto-resistive sensor or a fluxgate sensor.

* * * * *